(12) United States Patent
Xiao

(10) Patent No.: US 11,614,926 B2
(45) Date of Patent: Mar. 28, 2023

(54) CONSENSUS MECHANISM DEPLOYMENT METHOD AND APPARATUS

(71) Applicant: BAIDU ONLINE NETWORK TECHNOLOGY (BEIJING) CO., LTD., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 62 days.

(21) Appl. No.: 16/963,491

(22) PCT Filed: May 20, 2019

(86) PCT No.: PCT/CN2019/087574
§ 371 (c)(1),
(2) Date: Jul. 20, 2020

(87) PCT Pub. No.: WO2020/015447
PCT Pub. Date: Jan. 23, 2020

(65) Prior Publication Data
US 2021/0132928 A1     May 6, 2021

(30) Foreign Application Priority Data
Jul. 16, 2018   (CN) .......................... 201810779236.8

(51) Int. Cl.
G06F 9/445     (2018.01)
G06F 8/60      (2018.01)
(Continued)

(52) U.S. Cl.
CPC .............. *G06F 8/60* (2013.01); *H04L 9/0643* (2013.01); *H04L 9/3268* (2013.01); *H04L 9/50* (2022.05)

(58) Field of Classification Search
CPC ....................................................... G06F 8/60
(Continued)

(56) References Cited

U.S. PATENT DOCUMENTS 9,386,079 B2 *   7/2016   Ramalingam ....... H04L 41/0806
10,142,276 B2 *  11/2018  Rapaport ................ H04L 51/52
(Continued)

FOREIGN PATENT DOCUMENTS

AU    2018100566 A4    5/2018
CN    107147704 A      9/2017
(Continued)

OTHER PUBLICATIONS

Chinese Patent Application No. 201810779236.8 Office Action dated Mar. 3, 2020, 6 pages.
(Continued)

*Primary Examiner* — Evral E Bodden
(74) *Attorney, Agent, or Firm* — Cozen O'Connor

(57) ABSTRACT

Embodiments of the present disclosure provide a consensus mechanism deployment method and apparatus. The method includes: acquiring a customized consensus plugin, wherein the customized consensus plugin is obtained by compiling a customized consensus mechanism written based on a standardized consensus mechanism framework; and deploying the customized consensus plugin in a native node.

15 Claims, 4 Drawing Sheets

(51) Int. Cl.
  *H04L 9/06*     (2006.01)
  *H04L 9/32*     (2006.01)
  *H04L 9/00*     (2022.01)

(58) Field of Classification Search
  USPC .......................................................... 717/177
  See application file for complete search history.

(56) References Cited

U.S. PATENT DOCUMENTS

| | | | | |
|---|---|---|---|---|
| 10,965,455 | B2 * | 3/2021 | Park | H04W 12/033 |
| 2019/0238316 | A1 * | 8/2019 | Padmanabhan | G06N 20/00 |

FOREIGN PATENT DOCUMENTS

| | | | | | |
|---|---|---|---|---|---|
| CN | 107360248 | A | * | 11/2017 | H04L 12/18 |
| CN | 107360248 | A | | 11/2017 | |
| CN | 107402824 | A | | 11/2017 | |
| CN | 107579848 | A | | 1/2018 | |
| CN | 107733855 | A | | 2/2018 | |
| CN | 109002297 | A | | 12/2018 | |
| CN | 107579848 | B | * | 8/2020 | |
| CN | 108958787 | B | * | 11/2021 | G06F 8/656 |
| WO | WO 2018020944 | A1 | | 2/2018 | |

OTHER PUBLICATIONS

Chinese Patent Application No. 201810779236.8 English translation of Office Action dated Mar. 3, 2020, 6 pages.
PCT/CN/2019/087574 International Search Report and Written Opinion dated Jul. 24, 2019, 7 pages.
PCT/CN/2019/087574 English translation of International Search Report dated Jul. 24, 2019, 2 pages.
Blockchain Technology Implementation Chapter (1) Realization of Consensus Mechanism, Mar. 2018, 9 pages.
Zhang, F. et al. "Review of key technology and its application of block chain", Chinese Journal of Network and Information Security, Apr. 2018, vol. 4, No. 4, pp. 2018028-1-2018028-8.

* cited by examiner

CONSENSUS MECHANISM DEPLOYMENT METHOD AND APPARATUS

CROSS-REFERENCE TO RELATED APPLICATIONS

This application is a US national phase application of International Application No. PCT/CN2019/087574, filed on May 20, 2019, which claims priority to Chinese patent application No. 201810779236.8 filed on Jul. 16, 2018, the entire contents of which are incorporated herein by reference.

TECHNICAL FIELD

Embodiments of the present disclosure relate to a field of blockchain technologies, for example, to a consensus mechanism deployment method, apparatus, device and storage medium.

BACKGROUND

With the continuous development of Internet technology, a decentralized, open and transparent blockchain technology comes into being. The blockchain network may support different consensus mechanisms. As an important component of the blockchain technology, the consensus mechanism assists the blockchain network in verifying and confirming transactions generated within the blockchain, ensuring the consistency of all honest nodes in the blockchain network and the validity of transaction records.

Currently, the blockchain network has completed the configuration of the internal consensus mechanism at the early stages of its creation. For example, the corresponding consensus mechanism was configured when the genesis block was created, so that the nodes in the blockchain network achieves the verification and confirmation on transactions generated within the blockchain network in accordance with the consensus mechanism embedded in the blockchain network. For example, the consensus mechanism embedded in the Bitcoin application scenario is a Proof of Work (POW) mechanism, the consensus mechanism embedded in the Ethereum application scenario is a POW mechanism or Proof of Stake (POS) mechanism, and the consensus mechanism embedded in the Hyperledger Fabric application scenario is a Practical Byzantine Fault Tolerance (PBFT) mechanism or a distributed queue mechanism (Kafka).

However, after the creation of blockchain, the consensus mechanism is configured in the blockchain network in a fixed and non-modifiable form. The consensus mechanism embedded in the system cannot be updated and fails to meet the increasing or changing service requirements of blockchain creators.

SUMMARY

The following is an overview of the subject matter described in detail herein. This summary is not intended to limit the protection scope of the claims.

Embodiments of the present disclosure provide a consensus mechanism deployment method and apparatus, and a device and a storage medium, which may deploy a customized consensus mechanism for a blockchain network.

In a first aspect, embodiments of the present disclosure provide a consensus mechanism deployment method, which is executed by a node in a blockchain network. The method includes:

acquiring a customized consensus plugin, wherein the customized consensus plugin is obtained by compiling a customized consensus mechanism written based on a standardized consensus mechanism framework; and deploying the customized consensus plugin in a native node.

In a second aspect, embodiments of the present disclosure provide a consensus mechanism deployment apparatus, which is configured in a node in a blockchain network. The apparatus includes:

a plugin acquiring module, configured to acquire a customized consensus plugin, wherein the customized consensus plugin is obtained by compiling a customized consensus mechanism written based on a standardized consensus mechanism framework; and a plugin deploying module, configured to deploy the customized consensus plugin in a native node.

In a third aspect, embodiments of the present disclosure provide a device. The device includes:

one or more processors; and a memory, configured to store one or more programs.

When the one or more programs are executed by the one or more processors, the one or more processors are caused to implement the consensus mechanism deployment method according to any embodiment of the present disclosure.

In a fourth aspect, a computer-readable storage medium is provided by an embodiment of the present disclosure. The storage medium has stored a computer program thereon which, when executed by a processor, implement the consensus mechanism deployment method according to any embodiment of the present disclosure.

According to embodiments of the present disclosure, the customized consensus mechanism is written by using the standardized consensus mechanism framework, the written customized consensus mechanism is compiled into the customized consensus plugin, and the customized consensus mechanism is deployed in the native node in the form of a plugin. According to embodiments of the present disclosure, the customized consensus mechanism is written based on the standardized consensus mechanism framework, thereby realizing deploying, for the blockchain network, a consensus mechanism meeting the service requirements of a blockchain creator, providing a method for modifying or updating the consensus mechanism in the blockchain network, and improving the transaction processing capability of the blockchain network and user experience.

After reading and understanding the drawings and detailed description, other aspects may be understood.

DETAILED DESCRIPTION

Figure 1:
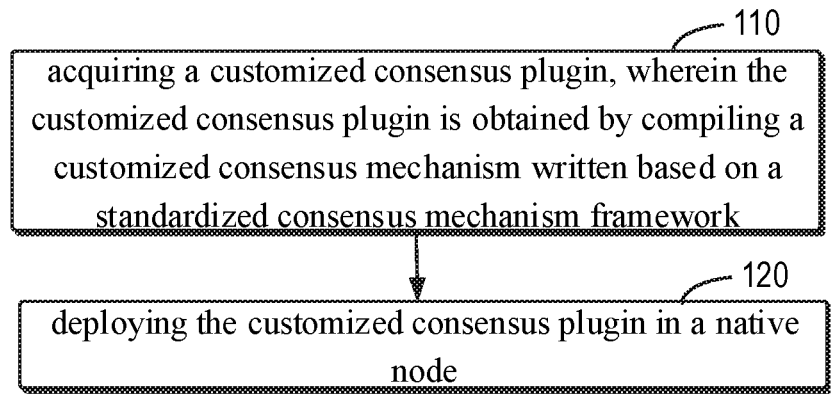
FIG. 1 is a flowchart of a consensus mechanism deployment method according to Embodiment 1 of the present disclosure.

Embodiments of the present disclosure will be further described in detail below in conjunction with the accompanying drawings and embodiments. It may be understood that the specific embodiments described herein are only used to explain the embodiments of the present disclosure, but not to limit the present disclosure. It should also be noted that, for the convenience of description, only some but not all the structures related to the embodiments of the present disclosure are shown in the drawings.

Embodiment 1

FIG. 1 is a flowchart of a consensus mechanism deployment method according to Embodiment 1 of the present disclosure. This method is applied to a node in a blockchain network. The blockchain may be a Public blockchain, a Consortium blockchain, or a Private blockchain. The blockchain network generally includes multiple nodes. The embodiment of the present disclosure is applicable to a case where a customized consensus mechanism is proposed in accordance with user requirements, and this method may be executed by a consensus mechanism deployment apparatus which is configured in the node of the blockchain network. In detail, the method includes the following steps.

At block S110, a customized consensus plugin is acquired, wherein the customized consensus plugin is obtained by compiling a customized consensus mechanism written based on a standardized consensus mechanism framework.

In this embodiment, the customized consensus mechanism refers to a code segment written by one node in the blockchain network in accordance with the user's service requirements and executable by each node in the blockchain network for verification and confirmation on transactions. The customized consensus plugin refers to an executable file into which the node writing the customized consensus mechanism compiles the customized consensus mechanism codes, and is configured in nodes of a blockchain website in the form of a plugin. It should be noted that the customized consensus plugin may be written and compiled by a user of a native node, and may also be an executable file into which the customized consensus mechanism codes written by other users in other nodes in the blockchain network are compiled, and which is published to the native node.

In detail, the standardized consensus mechanism framework is used in this embodiment write the customized consensus mechanism. The consensus mechanism architecture is standardized by the standardized consensus mechanism framework, which may perform the uniform limitation on the writing way such as the writing format, existence form, and naming rules of the consensus mechanism. Therefore, when the custom consensus mechanism is written by the node in the blockchain network, it is sufficient to customize the corresponding content of the consensus mechanism on the basis of the standardized consensus mechanism framework in accordance with the writing rules within the framework. The standardized consensus mechanism framework in this embodiment not only unifies the writing way of the consensus mechanism, but also facilitates users' writing and uniformly calling the consensus mechanism in the later period.

Further, the customized consensus mechanism in this embodiment may be written using a native language of blockchain, in which the native language of blockchain refers to a language which may be used to write the underlying network architecture of blockchain, for example, GO, Java, or C++, etc.

Exemplarily, the standardized consensus mechanism framework in this embodiment includes at least three basic consensus operation functions, which are an initialization function, a block generating authority verification function and a block validity verification function, respectively. It may be understood that the initialization function is used to initialize the customized consensus mechanism in accordance with the current state of the blockchain network when the customized consensus mechanism is first deployed in the node of the blockchain network, for example, initial values are assigned to the parameters or conditions included in the customized consensus mechanism; the block generating authority verification function is used to verify whether a transaction authority is strived; and the block validity verification function is used to verify the validity of the transactions recorded in the new block.

It is worth noting that in this embodiment, even when the existing consensus mechanism is taken as the consensus mechanism of the current blockchain network, the existing consensus mechanism still needs to be standardized in accordance with the standardized consensus mechanism framework for converting its formats or forms, so as to conform to the consensus mechanism framework in the current blockchain network. Exemplarily, in the above example, if the POW mechanism is taken as the consensus mechanism of the current blockchain network, the POW mechanism needs to be converted into an existence form including three functions of the initialization function, the block generating authority verification function and the block validity verification function, and names of the functions need to be normalized in accordance with the naming rules.

Further, during the process of acquiring the customized consensus plugin, if the customized consensus mechanism is initiated by the native node, the native node may obtain the customized consensus mechanism written based on the standardized consensus mechanism framework, and may compile the customized consensus mechanism to acquire the customized consensus plugin. Then this customized consensus plugin is sent to other nodes included in the blockchain network, so that this customized consensus plugin is deployed in other nodes. If the customized consensus mechanism is initiated by other nodes in the blockchain network, the native node may receive the customized consensus plugin sent by the other node in the blockchain network. This enables the uniform deployment of the customized consensus mechanism in each node of the blockchain network.

At block S120, the customized consensus plugin is deployed in a native node.

In this embodiment, regardless of whether the customized consensus mechanisms are issued by the native node or other nodes in the blockchain network, the customized consensus plugin will be published to each node of the blockchain network, so that the consensus mechanisms within the blockchain network are unified, and the transactions within the blockchain network may be verified and confirmed in accordance with the consistent consensus mechanism by all nodes in the blockchain network. Further, after the native node acquires the customized consensus plugin, the customized consensus plugin is deployed in the native node. It may be understood that the customized consensus plugin may be deployed in the physical machine of the native node in the form of plugin.

Further, after the customized consensus plugin is deployed in the native node, it is also possible to determine whether the customized consensus mechanism may be taken as the consensus mechanism used by the blockchain network in accordance with different types of blockchain and the authority of the node. When the blockchain is created, the consensus mechanism configured for the blockchain network is exactly the consensus mechanism used by the blockchain network. In addition, it is also possible to determine whether the customized consensus mechanism may be taken as the consensus mechanism used by the blockchain network through the voting of nodes in the blockchain network or the designating of authorized nodes.

Exemplarily, if the current blockchain is a Public blockchain, the customized consensus mechanism may be taken as a pending transaction within the blockchain network. Most nodes in the blockchain network need to verify the deployed customized consensus mechanism in accordance with the existing consensus mechanism of the current blockchain network, i.e., to verify whether this customized consensus mechanism may be taken as the consensus mechanism used by the blockchain network. Accordingly, the node issuing the customized consensus mechanism generates an updating request including the customized consensus mechanism, and initiates a voting proposal transaction in accordance with the updating request. In detail, when the voting proposal transaction is initiated, a voting effective block height may be determined, and the voting proposal transaction may be initiated in accordance with the updating request and the voting effective block height, so that the block generating node votes in response to the voting proposal transaction, if the current block height to be generated is detected to be the voting effective block height. A voting effective ratio threshold of the voting proposal transaction may also be determined, and the voting proposal transaction is initiated in accordance with the updating request and the voting effective ratio threshold, so that the block generating node determines that the vote is passed if the ratio of "yes" votes is greater than the voting effective ratio threshold. The voting effective ratio threshold is acquired by obtaining the voting effective ratio threshold set by the native node. If the set voting effective ratio threshold is equal to or less than the voting effective ratio threshold of the system, the voting effective ratio threshold of the system is taken as the voting effective ratio threshold in the voting proposal transaction; otherwise, the set voting effective ratio threshold is taken as the voting effective ratio threshold in the voting proposal transaction. Further, the voting proposal transaction is transmitted in the blockchain network, so that the block generating node votes in response to the voting proposal transaction. If the vote is passed, the customized consensus mechanism is taken as the consensus mechanism used by the blockchain network, achieving updating the consensus mechanism in the blockchain network. It may be understood that when the consensus mechanism is updated in the blockchain network, it is necessary to replace the updated consensus mechanism with the custom consensus mechanism based on the standardized consensus mechanism framework. For example, on the basis of the above-mentioned consensus mechanism framework containing three basic consensus operation functions, it is necessary to replace the three functions in the consensus mechanism to be updated with the corresponding three functions in the customized consensus mechanism.

Exemplarily, if the current blockchain network is a Consortium blockchain or a Private blockchain, a specific node in the blockchain network has a certain authority and may designate the consensus mechanism used by the blockchain. Further, such a node may designate the customized consensus mechanism deployed in respective nodes of the blockchain network.

The customized consensus mechanism also includes the initialization function. Further, the customized consensus mechanism is taken as one new consensus mechanism used in the blockchain network. If the node detects that the customized consensus mechanism is taken as the consensus mechanism used in the blockchain network, a state of the customized consensus mechanism is initialized with the initialization function in the customized consensus mechanism. Exemplarily, on the basis of the standardized consensus mechanism framework, at least two consensus operation functions in the customized consensus mechanism may be initialized with the initialization function in the customized consensus mechanism, in which the at least two consensus operation functions include a block generating authority verification function and a block validity verification function. Finally, the corresponding consensus operation function is called from the customized consensus mechanism based on the initialized customized consensus mechanism and the name of the consensus operation function in the consensus mechanism framework.

According to the technical solution of the present embodiment, the standardized consensus mechanism framework is used to write the customized consensus mechanism, the written customized consensus mechanism is compiled into the customized consensus plugin, and the customized consensus mechanism is deployed in the native node in the form of plugin. According to embodiments of the present embodiment, the customized consensus mechanism is written based on the standardized consensus mechanism framework, thereby realizing deploying, for the blockchain network, the consensus mechanism meeting the service requirements of the blockchain creator, providing a method for modifying or updating the consensus mechanism in the blockchain network, and improving the transaction processing capability of the blockchain network and user experience.

Embodiment 2

Figure 2:
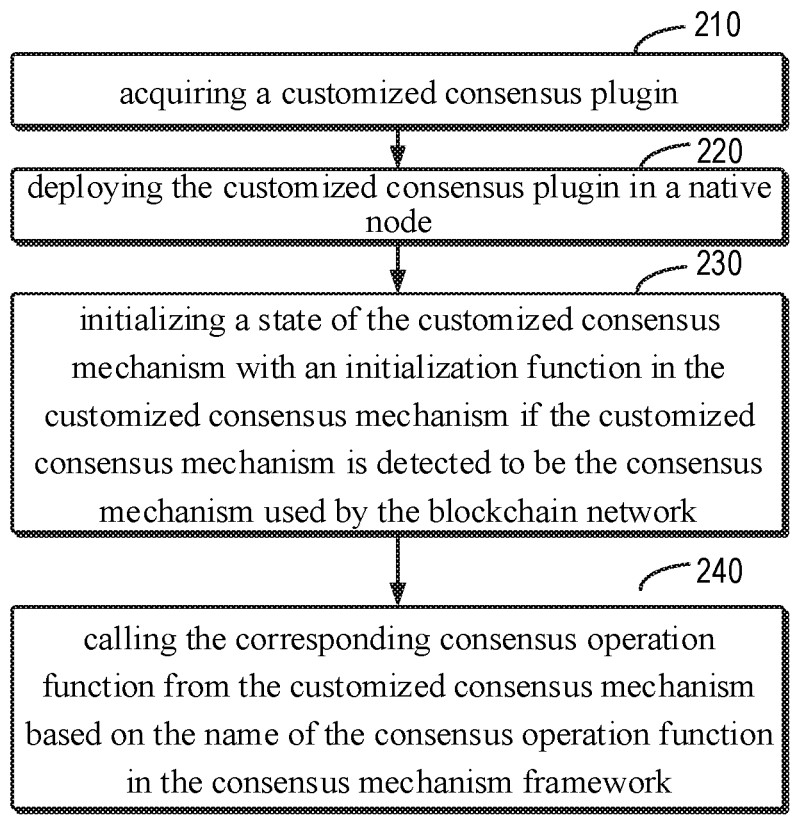
FIG. 2 is a flowchart of a consensus mechanism deployment method according to Embodiment 2 of the present disclosure.

On the basis of Embodiment 1 described above, a preferred implementation of the consensus mechanism deployment method is provided by this embodiment, which may initialize and call the customized consensus mechanism deployed in the node. FIG. 2 is a flowchart of a consensus mechanism deployment method according to Embodiment 2 of the present disclosure. As illustrated in FIG. 2, the method specifically includes the following steps.

At block S210, a customized consensus plugin is acquired.

In this embodiment, the customized consensus plugin is obtained by compiling the custom consensus mechanism written based on the standardized consensus mechanism framework. The consensus mechanism architecture is standardized by the standardized consensus mechanism framework, which may perform the uniform limitation on the writing way such as the writing format, existence form, and naming rules of the consensus mechanism. The consensus mechanism framework of the present embodiment includes at least three basic consensus operation functions, which are an initialization function, a block generating authority verification function and a block validity verification function.

In detail, if the customized consensus mechanism is initiated by the native node, alternatively, the native node obtains the customized consensus mechanism written based on the standardized consensus mechanism framework, and compiles the customized consensus mechanism to obtain the customized consensus plugin. The customized consensus mechanism is written by the user of the native node, and is compiled into an executable file in the form of a plugin. Further, the customized consensus plugin is sent to other nodes included in the blockchain network, so that the customized consensus plugin is deployed in other nodes. Since the consensus mechanism followed by each node of the blockchain network is consistent, it is necessary to issue the customized consensus plugin to all other nodes in the blockchain network, after the customized consensus plugin has been compiled by the native node, to ensure the consistency of consensus mechanism within the network. If the customized consensus mechanism is initiated by other nodes in the blockchain network, alternatively, the customized consensus plugin sent by other nodes in the blockchain network is received. At this time, the native node only needs to wait for receiving the customized consensus plugin.

At block S220, the customized consensus plugin is deployed in the native node.

In this embodiment, the customized consensus plugin is deployed in the native node after the customized consensus plugin is acquired by the native node. It may be understood that the customized consensus plugin may be deployed in the physical machine of the native node in the form of a plugin.

At block S230, a state of the customized consensus mechanism is initialized with an initialization function in the customized consensus mechanism if the customized consensus mechanism is detected to be the consensus mechanism used by the blockchain network.

In this embodiment, the initialization function included in the customized consensus mechanism may be an initialization rule of the customized consensus mechanism, or may be used to initialize executable code segments. The initialization function is able to be called in a form of functions by the blockchain network to perform the initialization, and is used to assign initial values to each parameter or condition in the customized consensus mechanism first configured in the native node and provide a basis for the operation of the customized consensus mechanism.

In detail, after the customized consensus plugin is deployed in the native node, it is possible to determine whether the customized consensus mechanism may be taken as the consensus mechanism used by the blockchain network in accordance with different types of blockchain and the authority of nodes. The consensus mechanism configured for the blockchain network when the blockchain is created is exactly the consensus mechanism used by the blockchain network. In addition, it is also possible to determine whether the customized consensus mechanism may be taken as the consensus mechanism used by the blockchain network through the voting of nodes in the blockchain network or the designating of authorized nodes. If the consensus mechanism is configured when the blockchain is created, or the vote that includes a voting proposal transaction of the customized consensus mechanism is passed, or the consensus mechanism to be used is designated by an authorized node, it is considered that the customized consensus mechanism is detected to be the consensus mechanism used by the blockchain network. The customized consensus mechanism is one new consensus mechanism in the blockchain network. The state of the customized consensus mechanism is initialized by the node with the initialization function in the customized consensus mechanism.

Alternatively, at least two consensus operation functions in the customized consensus mechanism are initialized with the initialization function in the customized consensus mechanism, where the at least two consensus operation functions include a block generating authority verification function and a block validity verification function.

In this embodiment, given that the consensus mechanism framework includes at least three basic consensus operation functions of an initialization function, a block generating authority verification function and a block validity verification function, the block generating authority verification function and the block validity verification function may be initialized with the initialization function in accordance with the current state of the blockchain network.

At block S240, the corresponding consensus operation function is called from the customized consensus mechanism based on the name of the consensus operation function in the consensus mechanism framework.

In this embodiment, given that the consensus mechanism framework specifies the writing format, existence form, and naming rules of the consensus mechanism, in this embodiment, the corresponding consensus mechanism may be called from the customized consensus mechanism based on the name of the consensus operation function in the consensus mechanism framework. Exemplarily, when a new block is generated in the blockchain network, the block validity verification function with a matching function name is found from the customized consensus mechanism in accordance with the unified naming rules and is called to verify the validity of the transaction records in the new block.

According to the technical solution of the present embodiment, the customized consensus mechanism to be used is initialized by acquiring the customized consensus plugin and deploying it to each node in the blockchain network, so that the corresponding consensus operation function in the customized consensus mechanism may be called in accordance with the consensus mechanism framework. According to embodiments of the present disclosure, the customized consensus mechanism is written based on the standardized consensus mechanism framework, thereby realizing deploying, for the blockchain network, the consensus mechanism meeting the service requirements of the blockchain creator, providing a method for modifying or updating the consensus mechanism in the blockchain network, and improving the transaction processing capability of the blockchain network and user experience.

Embodiment 3

Figure 3:
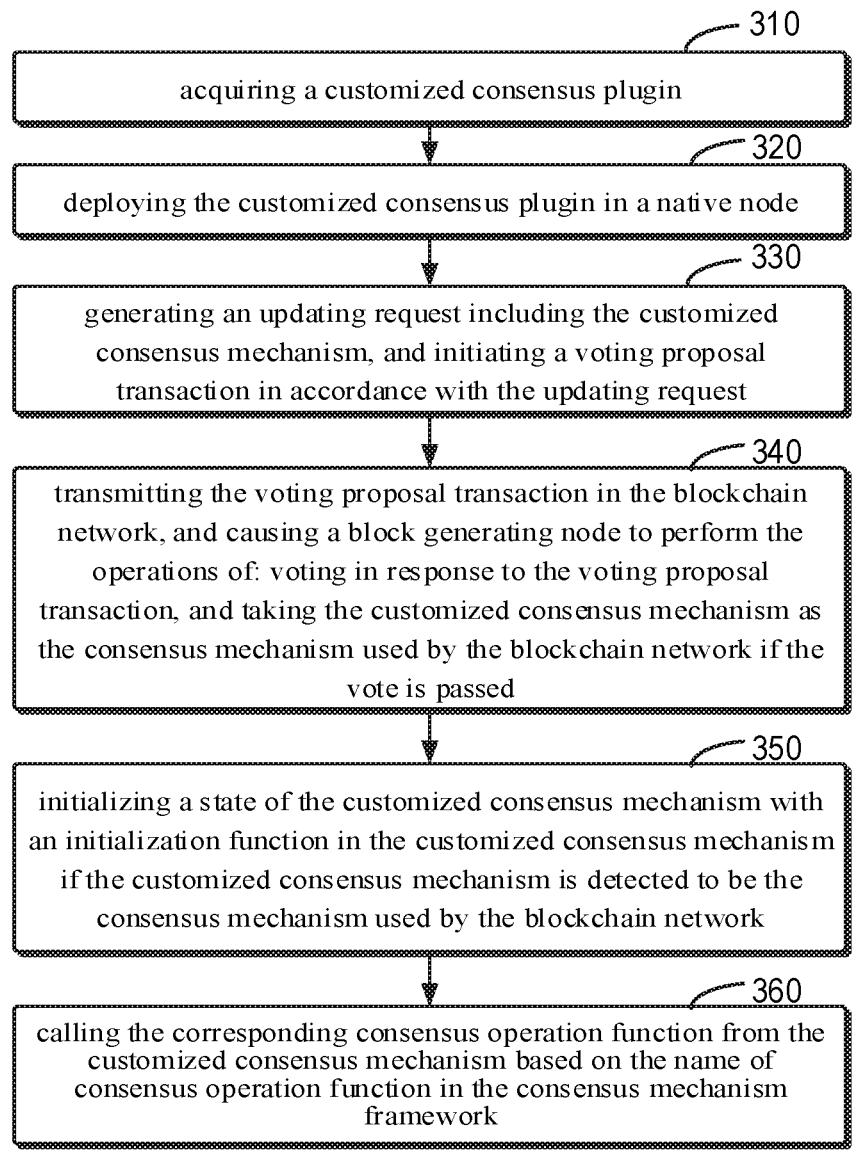
FIG. 3 is a flowchart of a consensus mechanism deployment method according to Embodiment 3 of the present disclosure.

On the basis of Embodiment 1 described above, a preferred implementation of the consensus mechanism deployment method is provided by this embodiment, which may update the consensus mechanism in the blockchain network based on the customized consensus mechanism. FIG. 3 is a flowchart of a consensus mechanism deployment method according to Embodiment 3 of the present disclosure. As illustrated in FIG. 3, the method includes the following specific steps.

At block S310, a customized consensus plugin is acquired.

In this embodiment, the customized consensus plugin is obtained by compiling the customized consensus mechanism written based on the standardized consensus mechanism framework. If the customized consensus mechanism is initiated by the native node, alternatively, the customized consensus mechanism written based on the standardized consensus mechanism framework is obtained, and the customized consensus mechanism is compiled to obtain the customized consensus plugin. Further, the customized consensus plugin is sent to other nodes included in the blockchain network, so that the customized consensus plugin is deployed in other nodes, thereby enabling all nodes in the blockchain network to obtain the customized consensus plugin. If the customized consensus mechanism is initiated by other nodes in the blockchain network, alternatively, the customized consensus plugin sent by other nodes in the blockchain network is received.

At block S320, the customized consensus plugin is deployed in the native node.

In this embodiment, the customized consensus plugin is deployed in the native node after the customized consensus plugin is acquired by the native node.

At block S330, an updating request including the customized consensus mechanism is generated, and a voting proposal transaction is initiated in accordance with the updating request.

In this embodiment, when the existing consensus mechanism in the blockchain network is updated, an updating request including the customized consensus mechanism may be generated after acquiring and deploying the customized consensus mechanism, and a voting proposal transaction is initiated in accordance with the updating request.

Alternatively, a voting effective block height is determined; the voting proposal transaction is initiated in accordance with the updating request and the voting effective block height, so that the block generating node votes in response to the voting proposal transaction, if the current block height to be generated is detected to be the voting effective block height.

In this embodiment, the time point at which the voting starts may be limited. Since the block production time in the blockchain network is fixed and the block height is sequentially increased, the voting effective block height may be set, i.e., the time point at which the voting operation starts is determined. Further, the voting proposal transaction is initiated in in accordance with the updating request and the voting effective block height. This voting proposal transaction is used to instruct the block generating node to detect the current block height. If the current block height to be generated is detected to be the voting effective block height, response is made to the voting proposal transaction and most nodes or special nodes in the blockchain network are instructed to vote on the voting proposal transaction associated with the updating request.

Exemplarily, the voting effective block height is determined to be 469739. The voting proposal transaction including the voting effective block height of 469739 is initiated in accordance with the updating request and the voting effective block height, so that the block generating node always detects whether the current block height to be generated is 469739, and controls the blockchain network to start voting and gets the voting result when determining that the block with the block height of 469739 is generated. Finally, the voting result is determined in accordance with the default voting effective ratio threshold of the system. If the ratio of "yes" votes is greater than this default voting effective ratio threshold, it is determined that the vote is passed and the consensus mechanism may be updated. The three functions in the consensus mechanism to be updated are replaced with the corresponding three functions in the customized consensus mechanism.

Alternatively, the voting effective ratio threshold of the voting proposal transaction is determined; the voting proposal transaction is initiated in accordance with the updating request and the voting effective ratio threshold, so that the block generating node determines that the vote is passed if the ratio of "yes" votes is greater than the voting effective ratio threshold.

In this embodiment, a default voting effective ratio threshold exists in the blockchain system. In addition, the initiator may also set a voting effective ratio threshold. For example, the voting effective ratio threshold may be set as 80%. The voting effective ratio threshold reflects a ratio of the number of nodes that agree with the updating request to the total number of voting nodes. It may be understood that the higher the voting effective ratio, the better, which indicates that more nodes in the blockchain network agree with the update of consensus mechanism.

Further, the voting effective ratio threshold set by the native node is acquired; if the set voting effective ratio threshold is equal to or less than the voting effective ratio threshold of the system, the voting effective ratio threshold of the system is taken as the voting effective ratio threshold in the voting proposal transaction; otherwise, the set voting effective ratio threshold is taken as the voting effective ratio threshold in the voting proposal transaction.

In this embodiment, when the initiator sets the voting effective ratio threshold, the larger one of the voting effective ratio threshold set by the native node and the default voting effective ratio threshold of the system is selected as the voting effective ratio threshold for the voting proposal transaction.

In this embodiment, when the voting effective ratio threshold for the voting proposal transaction is determined, the voting proposal transaction is initiated in accordance with the updating request and the voting effective ratio threshold for the voting proposal transaction. This voting proposal transaction is used to instruct the block generating node to control the voting of blockchain network on the voting proposal transaction associated with the updating request and obtain the voting result. Finally, the voting result is determined in accordance with the determined voting effective ratio threshold. If the ratio of "yes" votes is greater than this voting effective ratio threshold, it is determined that the vote is passed and the consensus mechanism may be updated.

Exemplarily, assuming that the default voting effective ratio threshold of the system is 60%, and the voting effective ratio threshold set by the node is 80%, it may be determined by comparison that the voting effective ratio threshold set by the node is the voting effective ratio threshold for the voting proposal transaction, i.e., 80%. Further, the voting proposal transaction including the voting effective ratio threshold of 80% is initiated in accordance with the updating request and the voting effective ratio threshold, so that the block generating node controls the nodes in the blockchain network to start voting and obtain the voting result. Finally, the voting result is determined in accordance with the voting effective ratio threshold of 80%. If the ratio of "yes" votes is greater than 80%, it is determined that the vote is passed, the consensus mechanism may be updated, and the three functions in the consensus mechanism to be updated are replaced with the corresponding three functions in the customized consensus mechanism.

It should be noted that the two methods of initiating the voting proposal transaction may be used independently or in combination, and settings on specific parameters in the voting proposal transaction is not limited to the above two methods.

At block S340, the voting proposal transaction is transmitted in the blockchain network, so that the block generating node performs the operations of voting in response to the voting proposal transaction, and taking the customized consensus mechanism as the consensus mechanism used by the blockchain network if the vote is passed.

In this embodiment, when the initiator of the updating request initiates a voting proposal transaction, the voting proposal transaction is transmitted to the blockchain network, so that most nodes or specific nodes in the blockchain network and the current block generating node receive the voting proposal transaction. Further, the block generating node supervises all transactions associated with the voting proposal transaction in the blockchain network, judges the blockchain network environment, the initiator of the updating request, and the content associated with the updating request in accordance with the voting proposal transaction, and determines whether to respond to the voting proposal transaction in accordance with the judgment results. For example, the judgment may be made in accordance with data information specified in the voting proposal transaction such as block height. If it is possible to vote on the voting proposal transaction, most nodes or specific nodes in the blockchain network vote on the voting proposal transaction. In accordance with the voting results, the block generating node updates the consensus mechanism in response to the updating request if the vote is passed. The consensus mechanism to be updated is replaced with the customized consensus mechanism, achieving the update of the consensus mechanism.

At block S350, a state of the customized consensus mechanism is initialized with an initialization function in the customized consensus mechanism if the customized consensus mechanism is detected to be the consensus mechanism used by the blockchain network.

In this embodiment, the initialization function included in the customized consensus mechanism may be an initialization rule of the customized consensus mechanism, or may be used to initialize executable code segments. The initialization function is able to be called in a form of functions by the blockchain network to perform the initialization, and is used to assign initial values to each parameter or condition in the customized consensus mechanism first configured in the native node and provides a basis for the operation of the customized consensus mechanism. Alternatively, at least two consensus operation functions in the customized consensus mechanism are initialized with the initialization function in the customized consensus mechanism, wherein the at least two consensus operation functions include a block generating authority verification function and a block validity verification function.

At block S360, the corresponding consensus operation function is called from the customized consensus mechanism based on the name of the consensus operation function in the consensus mechanism framework.

In this embodiment, given that the consensus mechanism framework specifies the writing format, existence form, and naming rules of the consensus mechanism, the corresponding consensus operation function may be called from the customized consensus mechanism based on the name of the consensus operation function in the consensus mechanism framework.

In addition, it is considered in this embodiment that the customized consensus mechanism meets the user requirements of its initiator, and accordingly, the initiator needs to pay a certain price for it. Therefore, when the voting proposal transaction including the customized consensus mechanism is initiated in this embodiment, a freezing certificate for initiating a proposal may also be determined, and the voting proposal transaction including the customized consensus mechanism and the freezing certificate may be initiated, wherein the freezing certificate is used to allow the blockchain network to freeze the assets of the initiator, where freezing conditions or freezing time may be limited, that is, freezing is performed once a certain block height is reached.

According to the technical solution of the present embodiment, after acquiring the customized consensus plugin and deploying it in each node of the blockchain network, a voting proposal transaction associated with the updating request is initiated by generating the updating request including the customized consensus mechanism and setting the voting effective block height and/or the voting effective ratio threshold associated with the voting proposal transaction in accordance with the updating request and is finally transmitted to the blockchain network, so that the block generating node responds and controls the nodes in the blockchain network to vote and obtain the voting result, and the consensus mechanism is updated using the customized consensus mechanism passing the vote. The customized consensus mechanism to be used is initialized and the corresponding consensus operation function in the customized consensus mechanism is called in accordance with the consensus mechanism framework. According to embodiments of the present disclosure, the customized consensus mechanism is written based on the standardized consensus mechanism framework, thereby realizing updating the consensus mechanism in the blockchain network, deploying, for the blockchain network, the consensus mechanism meeting the service requirements of the blockchain creator, providing a method for modifying or updating the consensus mechanism in the blockchain network, and improving the transaction processing capability of the blockchain network and user experience.

Embodiment 4

Figure 4:
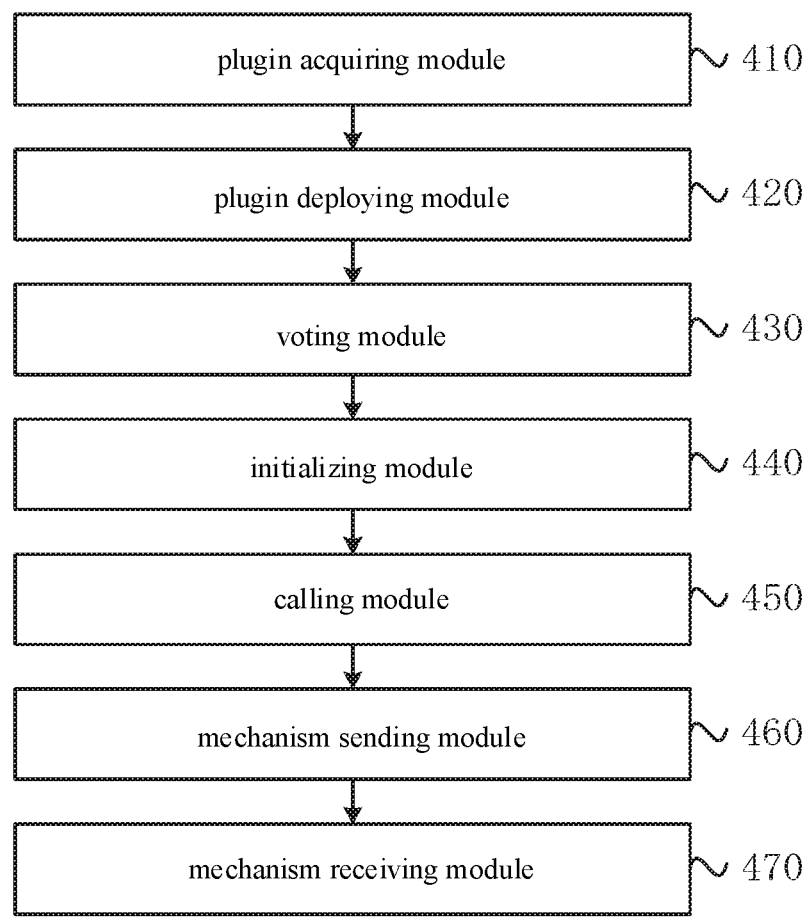
FIG. 4 is a schematic block diagram of a consensus mechanism deployment apparatus according to Embodiment 4 of the present disclosure.

FIG. 4 is a schematic block diagram of a consensus mechanism deployment apparatus according to Embodiment 4 of the present disclosure. This embodiment of the present disclosure is applicable to a case where a customized consensus mechanism is proposed in accordance with user requirements. The apparatus is configured in a node of a blockchain network, which may implement the consensus mechanism deployment method according to any embodiment of the present disclosure. The apparatus specifically includes a plugin acquiring module 410 and a plugin deploying module 420.

The plugin acquiring module 410 is configured to acquire a customized consensus plugin, in which the customized consensus plugin is obtained by compiling a customized consensus mechanism written based on a standardized consensus mechanism framework.

The plugin deploying module 420 is configured to deploy the customized consensus plugin in a native node.

In an embodiment, the apparatus further includes a voting module 430. The voting module 430 includes a voting proposal initiating unit and a voting proposal transaction transmitting unit.

The voting proposal initiating unit is configured to generate an updating request including the customized consensus mechanism, and initiating a voting proposal transaction in accordance with the updating request, after the customized consensus plugin is deployed in the native node.

The voting proposal transaction transmitting unit is configured to transmit the voting proposal transaction in the blockchain network, so that a block generating node performs the operations of voting in response to the voting proposal transaction, and taking the customized consensus mechanism as the consensus mechanism used by the blockchain network if the vote is passed.

In an embodiment, the apparatus further includes an initializing module 440.

After the customized consensus plugin is deployed in the native node, the initializing module 440 is configured to initialize a state of the customized consensus mechanism with an initialization function in the customized consensus mechanism if the customized consensus mechanism is detected to be the consensus mechanism used by the blockchain network.

In an embodiment, the initializing module 440 is specifically configured to:

initialize at least two consensus operation functions in the customized consensus mechanism with the initialization function in the customized consensus mechanism, wherein the at least two consensus operation functions include a block generating authority verification function and a block validity verification function.

In an embodiment, the apparatus further includes a calling module 450.

The calling module 450 is configured to call the corresponding consensus operation function from the customized consensus mechanism based on the name of the consensus operation function in the consensus mechanism framework, after the state of the custom consensus mechanism is initialized with the initialization function in the customized consensus mechanism.

In an embodiment, the voting proposal initializing unit includes a voting start time determining subunit and a voting proposal initiating subunit.

The voting start time determining subunit is configured to determine a voting effective block height.

The voting proposal initiating subunit is configured to initiate a voting proposal transaction in accordance with the updating request and the voting effective block height, so that the block generating node votes in response to the voting proposal transaction, if the current block height to be generated is detected to be the voting effective block height.

In an embodiment, the voting proposal initiating unit includes a voting effective threshold determining subunit and a voting proposal initiating subunit.

The voting effective threshold determining subunit is configured to determine a voting effective ratio threshold of the voting proposal transaction.

The voting proposal initiating subunit is configured to initiate the voting proposal transaction in accordance with the updating request and the voting effective ratio threshold, so that the block generating node determines that the vote is passed if the ratio of "yes" votes is greater than the voting effective ratio threshold.

In an embodiment, the voting effective threshold determining subunit is specifically configured to:

acquire the voting effective ratio threshold set by the native node; and if the set voting effective ratio threshold is equal to or less than a voting effective ratio threshold of the system, take the voting effective ratio threshold of the system as the voting effective ratio threshold in the voting proposal transaction; otherwise, take the set voting effective ratio threshold as the voting effective ratio threshold in the voting proposal transaction.

In an embodiment, the plugin acquiring module 410 includes a customized consensus mechanism acquiring unit and a compiling unit.

The customized consensus mechanism acquiring unit is configured to acquire the customized consensus mechanism written based on the standardized consensus mechanism framework.

The compiling unit is configured to compile the customized consensus mechanism to obtain the customized consensus plugin.

In an embodiment, the apparatus further includes a mechanism sending module 460.

The mechanism sending module 460 is configured to send the customized consensus plugin to other nodes included in the blockchain network after compiling the customized consensus mechanism to obtain the custom consensus plugin, so that the customized consensus plugin is deployed in the other nodes.

In an embodiment, the apparatus further includes a mechanism receiving module 470.

The mechanism receiving module 470 is configured to receive the customized consensus plugin sent by other nodes in the blockchain network.

According to the technical solution of the present embodiment, various functional modules cooperate with each other, achieving functions such as, writing consensus mechanism codes based on the standardized consensus mechanism framework, the compiling of consensus plugin, receiving or sending the customized consensus plugin, deploying the consensus plugin, generating the updating request, initiating the voting proposal transaction, detecting and initializing the consensus mechanism, and calling consensus operation functions. According to embodiments of the present disclosure, the customized consensus mechanism is written based on the standardized consensus mechanism framework, thereby realizing updating the consensus mechanism in the blockchain network, deploying, for the blockchain network, the consensus mechanism meeting the service requirements of the blockchain creator, providing a method for modifying or updating the consensus mechanism in the blockchain network, and improving the transaction processing capability of the blockchain network and user experience.

Embodiment 5

Figure 5:
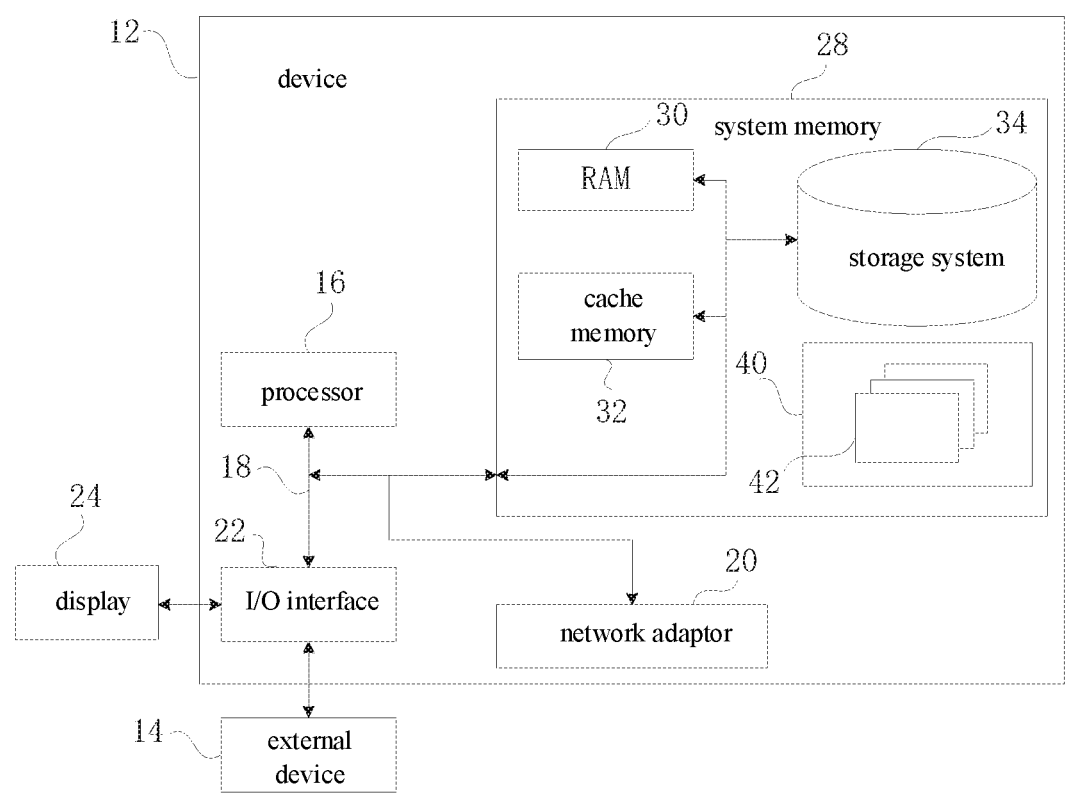
FIG. 5 is a schematic diagram of a device according to Embodiment 5 of the present disclosure.

FIG. 5 is a schematic diagram of a device provided by Embodiment 5 of the present disclosure, and FIG. 5 illustrates a block diagram of an exemplary device suitable for implementing embodiments of the present disclosure. The device illustrated in FIG. 5 is only an example, and should not impose any limitation on the functions and use range of embodiments of the present disclosure.

The device 12 shown in FIG. 5 is only an example, and should not impose any limitation on the function and use range of embodiments of the present disclosure.

As illustrated in FIG. 5, the device 12 is represented in the form of a general-purpose computing device. The components of the device 12 may include, but are not limited to, one or more processors 16, a system memory 28, and a bus 18 connecting different system components (including the system memory 28 and the processor 16).

The bus 18 represents one or more of several types of bus structures, including a memory bus or a memory controller, a peripheral bus, a graphics acceleration port, a processor, or a local area bus using any of a variety of bus structures. By way of example, these architectures include, but are not limited to, the Industry Standard Architecture (ISA) bus, the Micro Channel Architecture (MAC) bus, the enhanced ISA bus, the Video Electronics Standards Association (VESA) local area bus, and peripheral component interconnects (PCI) bus.

The device 12 typically includes a variety of computer system-readable media. These media may be any available media that may be accessed by the device 12, including volatile and non-volatile media, removable and non-removable media.

System memory 28 may include computer system readable media in the form of volatile memory, such as random access memory (RAM) 30 and/or cache memory 32. The device 12 may further include other removable/non-removable, volatile/nonvolatile computer system storage media. Only as an example, the storage system 34 may be used to read and write non-removable, non-volatile magnetic media (not shown in FIG. 5 and is commonly referred to as a "disk drive"). Although not shown in FIG. 5, a disk drive for reading and writing to a removable non-volatile disk (e.g., a "floppy disk"), and a removable non-volatile optical disk (e.g., a CD-ROM, DVD-ROM or other optical media) may be provided. In these cases, each drive may be connected to the bus 18 through one or more data medium interfaces. The system memory 28 may include at least one program product having a set (for example, at least one) of program modules configured to perform the functions of various embodiments of the present disclosure.

The program/utility tool 40, having a set (at least one) of program modules 42, may be stored in, for example, the system memory 28. Such program modules 42 include, but are not limited to, an operating system, one or more application programs, other program modules, and programs data, each or some combination of these examples may include an implementation of the network environment. The program module 42 generally performs functions and/or methods in the embodiments described in embodiments of the present disclosure.

The device 12 may also communicate with one or more external devices 14 (e.g., a keyboard, a pointing device, a display 24, etc.), and may also communicate with one or more devices that enable a user to interact with the device 12, and/or communicate with any device (e.g., a network card, modem, etc.) that enable the device 12 to communicate with one or more other computing devices. Such communication may be performed through an input/output (I/O) interface 22. Moreover, the device 12 may also communicate with one or more networks (e.g., a local area network (LAN), a wide area network (WAN), and/or a public network, e.g., the Internet) through the network adapter 20. As shown in the figure, the network adapter 20 communicates with other modules of the device 12 via the bus 18. It should be understood that although not shown in the figure, other hardware and/or software modules may be used in conjunction with the device 12, including but not limited to: microcode, device drivers, redundant processors, external disk drive arrays, RAID systems, tape drives, and data backup storage system.

The processor 16 executes various functional applications and data processing by running a program stored in the system memory 28, for example, a method for implementing a consensus mechanism provided by an embodiment of the present disclosure.

Embodiment 6

Embodiment 6 of the present disclosure further provides a computer-readable storage medium having stored computer programs (or computer-executable instructions) thereon which, when executed by a processor, implement the consensus mechanism deployment method. The method includes:

acquiring a customized consensus plugin, wherein the customized consensus plugin is obtained by compiling a customized consensus mechanism written based on a standardized consensus mechanism framework; and deploying the customized consensus plugin in a native node.

The computer storage medium in embodiments of the present disclosure may adopt any combination of one or more computer-readable medium. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination thereof. More specific examples (non-exhaustive list) of computer-readable storage media include: electrical connections with one or more wires, portable computer disks, hard disks, random access memory (RAM), read-only memory (ROM), Erasable programmable read-only memory (EPROM or flash memory), optical fiber, portable compact disk read-only memory (CD-ROM), optical storage device, magnetic storage device, or any suitable combination of the foregoing. In this document, a computer-readable storage medium may be any tangible medium that contains or stores a program that may be used by or in combination with an instruction execution system, apparatus, or device.

The computer-readable signal medium may include a data signal in baseband or propagated as part of a carrier wave, which carries a computer-readable program code. Such a propagated data signal may take many forms, including but not limited to electromagnetic signals, optical signals, or any suitable combination of the foregoing. The computer-readable signal medium may also be any computer-readable medium other than a computer-readable storage medium, and the computer-readable medium may send, propagate, or transmit a program for use by or in connection with an instruction execution system, apparatus, or device.

Program codes embodied on a computer-readable medium may be transmitted using any appropriate medium, including but not limited to wireless, wires, optical fiber cable, RF, etc., or any suitable combination of the foregoing.

The computer program codes for performing the operations of the embodiments of the present disclosure may be written in one or more programming languages or a combination thereof, the programming language including an object-oriented programming language such as Java, Smalltalk, C++, and also including regular procedural programming language such as "C" or similar programming language. The program codes may be executed entirely on the user's computer, partly on the user's computer, as an independent software package, partly on the user's computer and partly on a remote computer, or entirely on a remote computer or server. In the case of a remote computer, the remote computer may be connected to the user's computer through any kind of network, including a local area network (LAN) or a wide area network (WAN), or it may be connected to an external computer (for example, connected through the Internet by the Internet provider).

What is claimed is:
1. A consensus mechanism deployment method, executed by a node in a blockchain network, comprising:
acquiring a customized consensus plugin, wherein the customized consensus plugin is obtained by compiling a customized consensus mechanism written based on a standardized consensus mechanism framework; and deploying the customized consensus plugin in a native node, after deploying the customized consensus plugin in the native node, further comprising:

generating an updating request including the customized consensus mechanism, and initiating a voting proposal transaction in accordance with the updating request; and transmitting the voting proposal transaction in the blockchain network, so that a block generating node performs operations of voting in response to the voting proposal transaction, and taking the customized consensus mechanism as the consensus mechanism used by the blockchain network if the vote is passed, wherein initiating the voting proposal transaction in accordance with the updating request comprises:

determining a voting effective ratio threshold of the voting proposal transaction; and initiating the voting proposal transaction in accordance with the updating request and the voting effective ratio threshold, so that the block generating node determines that the vote is passed if a ratio of "yes" votes is greater than the voting effective ratio threshold, wherein determining the voting effective ratio threshold of the voting proposal transaction, comprises:

acquiring the voting effective ratio threshold set by the native node; and if the set voting effective ratio threshold is equal to or less than a voting effective ratio threshold of the system, taking the voting effective ratio threshold of the system as the voting effective ratio threshold in the voting proposal transaction; otherwise, taking the set voting effective ratio threshold as the voting effective ratio threshold in the voting proposal transaction.

2. The method according to claim 1, after deploying the customized consensus plugin in the native node, further comprising:

initializing a state of the customized consensus mechanism with an initialization function in the customized consensus mechanism, if the customized consensus mechanism is detected to be the consensus mechanism used by the blockchain network.

3. The method according to claim 2, wherein initializing the state of the customized consensus mechanism with the initialization function in the customized consensus mechanism, comprises:

initializing at least two consensus operation functions in the customized consensus mechanism with the initialization function in the customized consensus mechanism, wherein the at least two consensus operation functions include a block generating authority verification function and a block validity verification function.

4. The method according to claim 2, after initializing the state of the customized consensus mechanism with the initialization function in the customized consensus mechanism, further comprising:

calling the corresponding consensus operation function from the customized consensus mechanism based on a name of the consensus operation function in the consensus mechanism framework.

5. The method according to claim 1, wherein acquiring the customized consensus plugin comprises:

acquiring the customized consensus mechanism written based on the standardized consensus mechanism framework; and compiling the customized consensus mechanism to obtain the customized consensus plugin.

6. The method according to claim 5, after compiling the customized consensus mechanism to obtain the customized consensus plugin, further comprising:

sending the customized consensus plugin to other nodes included in the blockchain network, so that the customized consensus plugin is deployed in the other nodes.

7. The method according to claim 5, wherein acquiring the customized consensus plugin comprises:

receiving the customized consensus plugin sent by other nodes in the blockchain network.

8. A consensus mechanism deployment apparatus, configured in a node in a blockchain network, comprising:

a processor; and a memory, configured to store one or more software modules, wherein the processor is configured to run a program corresponding to a consensus mechanism deployment method by reading the software modules, the one or more software modules comprising:

a plugin acquiring module, configured to acquire a customized consensus plugin, wherein the customized consensus plugin is obtained by compiling a customized consensus mechanism written based on a standardized consensus mechanism framework; and a plugin deploying module, configured to deploy the customized consensus plugin in a native node, the one or more software modules further comprise a voting module, the voting module comprising:

a voting proposal initiating unit, configured to generate an updating request including the customized consensus mechanism after deploying the customized consensus plugin in the native node, and initiating a voting proposal transaction in accordance with the updating request;

a voting proposal transaction transmitting unit, configured to transmit the voting proposal transaction in the blockchain network, so that a block generating node performs operations of voting in response to the voting proposal transaction, and taking the customized consensus mechanism as the consensus mechanism used by the blockchain network if the vote is passed, wherein the voting proposal initiating unit comprises:

a voting effective threshold determining subunit, configured to determine a voting effective ratio threshold of the voting proposal transaction; and a voting proposal initiating subunit, configured to initiate the voting proposal transaction in accordance with the updating request and the voting effective ratio threshold, so that the block generating node determines that the vote is passed if the ratio of "yes" votes is greater than the voting effective ratio threshold, wherein the voting effective threshold determining subunit is further configured to:

acquire the voting effective ratio threshold set by the native node; and if the set voting effective ratio threshold is equal to or less than a voting effective ratio threshold of the system, take the voting effective ratio threshold of the system as the voting effective ratio threshold in the voting proposal transaction; otherwise, take the set voting effective ratio threshold as the voting effective ratio threshold in the voting proposal transaction.

9. The apparatus according to claim 8, wherein the one or more software modules further comprise:
an initializing module, configured to initialize a state of the customized consensus mechanism with an initialization function in the customized consensus mechanism if the customized consensus mechanism is detected to be the consensus mechanism used by the blockchain network, after deploying the customized consensus plugin in the native node.

10. The apparatus according to claim 9, wherein the initializing module is specifically configured to:
initialize at least two consensus operation functions in the customized consensus mechanism with the initialization function in the customized consensus mechanism, wherein the at least two consensus operation functions include a block generating authority verification function and a block validity verification function.

11. The apparatus according to claim 9, wherein the one or more software modules further comprise:
a calling module, configured to call the corresponding consensus operation function from the customized consensus mechanism based on a name of the consensus operation function in the consensus mechanism framework, after initializing the state of the customized consensus mechanism with the initialization function in the customized consensus mechanism.

12. The apparatus according to claim 8, wherein the plugin acquiring module comprises:
a customized consensus mechanism acquiring unit, configured to acquire the customized consensus mechanism written based on the standardized consensus mechanism framework; and
a compiling unit, configured to compile the customized consensus mechanism to obtain the customized consensus plugin.

13. The apparatus according to claim 8, wherein the one or more software modules further comprise:
a mechanism sending module, configured to send the customized consensus plugin to other nodes included in the blockchain network after compiling the customized consensus mechanism to obtain the customized consensus plugin, so that the customized consensus plugin is deployed in the other nodes.

14. The apparatus according to claim 8, wherein the one or more software modules further comprise:
a mechanism receiving module, configured to receive the customized consensus plugin sent by other nodes in the blockchain network.

15. A non-transitory computer-readable storage medium having stored a computer program thereon which, when executed by a processor, implement a consensus mechanism deployment method, the method comprising:
acquiring a customized consensus plugin, wherein the customized consensus plugin is obtained by compiling a customized consensus mechanism written based on a standardized consensus mechanism framework; and
deploying the customized consensus plugin in a native node;
after deploying the customized consensus plugin in the native node, further comprising:
generating an updating request including the customized consensus mechanism, and initiating a voting proposal transaction in accordance with the updating request; and
transmitting the voting proposal transaction in the blockchain network, so that a block generating node performs operations of voting in response to the voting proposal transaction, and taking the customized consensus mechanism as the consensus mechanism used by the blockchain network if the vote is passed,
wherein initiating the voting proposal transaction in accordance with the updating request comprises:
determining a voting effective ratio threshold of the voting proposal transaction; and
initiating the voting proposal transaction in accordance with the updating request and the voting effective ratio threshold, so that the block generating node determines that the vote is passed if a ratio of "yes" votes is greater than the voting effective ratio threshold,
wherein determining the voting effective ratio threshold of the voting proposal transaction, comprises:
acquiring the voting effective ratio threshold set by the native node; and
if the set voting effective ratio threshold is equal to or less than a voting effective ratio threshold of the system, taking the voting effective ratio threshold of the system as the voting effective ratio threshold in the voting proposal transaction; otherwise, taking the set voting effective ratio threshold as the voting effective ratio threshold in the voting proposal transaction.

* * * * *